May 10, 1949.  E. M. BARBER  2,469,448
INTERNAL-COMBUSTION ENGINE
Filed June 21, 1945  2 Sheets-Sheet 1

INVENTOR
EVERETT M. BARBER
BY
Daniel Stryker
ATTORNEYS

May 10, 1949.　　　　　E. M. BARBER　　　　　2,469,448
INTERNAL-COMBUSTION ENGINE
Filed June 21, 1945　　　　　　　　　　　　　　2 Sheets-Sheet 2
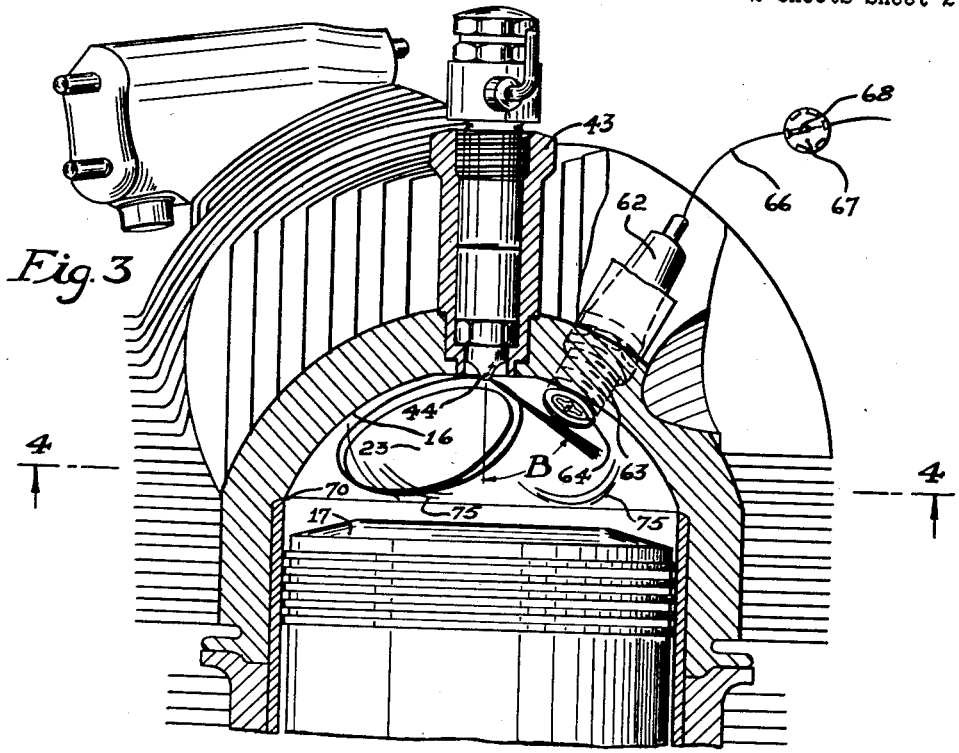
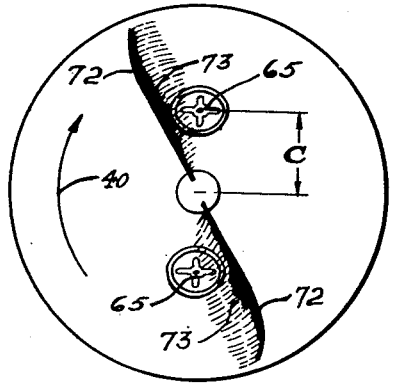
INVENTOR
EVERETT M. BARBER
BY
ATTORNEYS Patented May 10, 1949

2,469,448

UNITED STATES PATENT OFFICE 2,469,448

INTERNAL-COMBUSTION ENGINE

Everett M. Barber, Wappingers Falls, N. Y., assignor, by mesne assignments, to The Texas Company, New York, N. Y., a corporation of Delaware Application June 21, 1945, Serial No. 600,755

4 Claims. (Cl. 123—32)

This invention relates to an internal combustion engine and to a method of operating such an engine, wherein combustion is independent of fuel quality because preignition and spontaneous ignition with resultant knocking of the engine are prevented.

This is a continuation-in-part of my copending application Serial No. 529,310, filed April 3, 1944, now abandoned.

The present invention relates to a modification of the basic method and engine structure disclosed and claimed in my co-pending application Serial No. 10,598, filed February 25, 1948, as a continuation-in-part of Serial No. 513,232, filed December 7, 1943, now abandoned, which is particularly adaptable to large diameter engine cylinders of the type employed in airplane engines. This embodiment utilizes the basic principles set forth in the above mentioned applications, involving the use of swirling compressed air in the combustion space, injection of fuel into the swirling air with prompt spark ignition of combustible fuel vapor-air mixture substantially as soon as formed from the first increment of injected fuel to establish a flame front, and continuation of the injection immediately in advance of the flame front in its direction of burning to progressively form additional combustible fuel vapor-air mixtures which are ignited by the flame front and burned substantially as rapidly as formed.

In the preferred form of the invention in which swirling air is employed, the specific embodiment of my said above mentioned applications involving a tangentially arranged nozzle mounted in the cylinder wall at the periphery of the combustion space gives excellent results in small diameter cylinders up to about 4-5 inches in diameter. However, in larger diameter cylinders up to about 10 inches or more, the use of two or more tangentially arranged injection nozzles positioned equally around the cylinder is found desirable to properly impregnate the larger volume of compressed air and secure the desired maximum power and efficient operation. The use of two or more injection nozzles requires a corresponding number of fuel pumps and driving mechanisms therefor, which is uneconomical. Moreover, in certain types of engines, particularly airplane engines of the air-cooled fin type, difficulties are encountered in the mounting of the injection nozzles in the cylinder wall.

It is accordingly a principal object of the present invention to provide another embodiment of the non-knocking engine which is particularly adapted for larger diameter cylinders and permits the use of a single injection nozzle with its single fuel pump and drive mechanism.

It is a further object of the present invention to provide an engine of this character, and a method of operating such an engine, wherein a single centrally arranged fuel nozzle producing two or more radial jets can be employed, while still maintaining the combustion independent of fuel quality and free from danger of spontaneous ignition with resulting knocking.

An additional object of the present invention is to provide a novel engine construction, and method of operating such an engine of the type having a dome-shaped head, particularly an airplane engine of the air-cooled fin type, to permit the mounting of the valves, multi-ported injection nozzle and plural spark plugs in the dome-shaped head in proper relationship so that non-knocking combustion can be obtained.

Still another object of the invention is to provide a novel engine construction, and method of operating such an engine, having a centrally arranged injection nozzle with generally radial jet, wherein the engine is constructed to provide both induction air swirl about the longitudinal axis of the cylinder, and also air swirl in planes at right angles to the induction air swirl, which is adaptable to carrying out the non-knocking combustion in smaller diameter engine cylinders as well as in larger diameter cylinders.

Other objects and advantages of the present invention will be apparent from the following description when taken in conjunction with the attached drawing and appended claims.

The invention is more particularly illustrated in the attached drawing which discloses a preferred embodiment thereof, and in which:

Fig. 3 is a vertical sectional view taken on the plane of the line 3—3 of Fig. 2; and Fig. 4 is a diagrammatic view of the engine combustion space, looking upwardly from the plane of the line 4—4 of Fig. 3, more particularly illustrating the operation therein.

Figure 1:
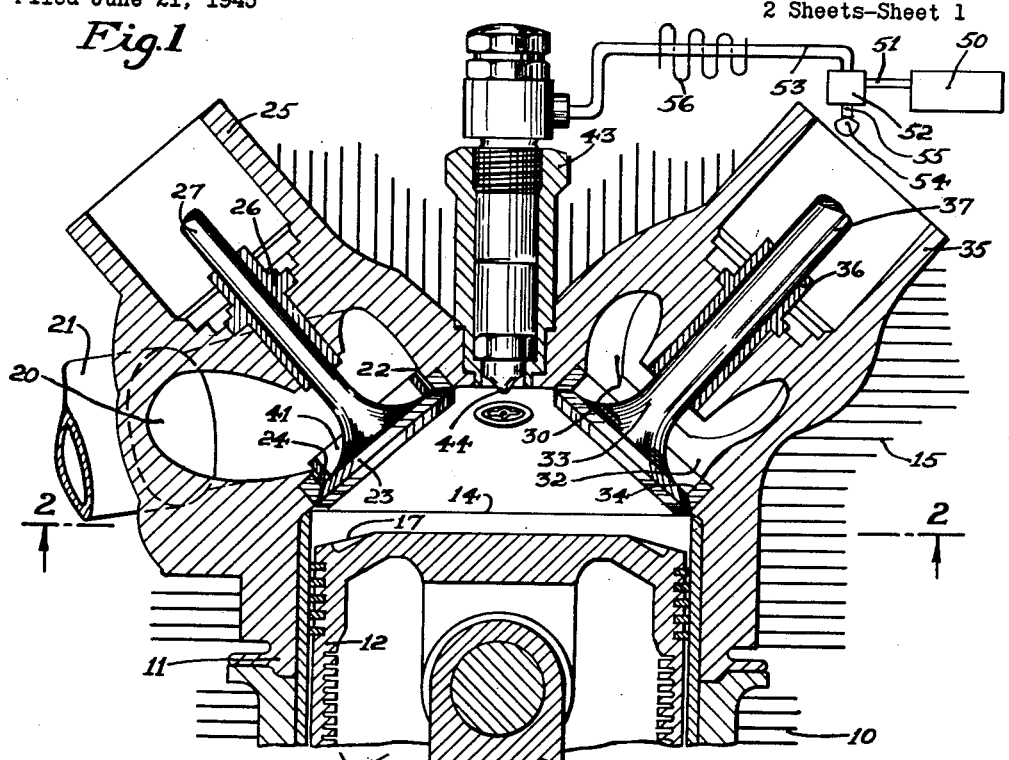
Fig. 1 is a vertical sectional view taken on the plane of the line 1—1 of Fig. 2, showing an air-cooled engine cylinder having a dome-shaped head and constructed in accordance with the invention, together with a diagrammatic illustration of a suitable fuel system therefor.

Referring to the drawing, the engine cylinder is shown at 10, the cylinder head at 11, and the piston at 12 having a connecting rod 13 which runs to the usual crank shaft (not shown). As shown, the engine is of the air-cooled type provided with fins 15 providing a substantially hemispherical combustion space 14, the cylinder head is dome-shaped as indicated at 16 (Fig. 3), and the piston is crowned as indicated at 17.

The dome-shaped cylinder head is formed with an intake passage 20 communicating with an air intake pipe 21, the inner end of said passage 20 having an intake port 22 controlled by intake valve 23 seating against valve seat 24. The cylinder head is formed with a hollow cylindrical extension 25 carrying valve guide 26 for the stem 27 of the intake valve 23.

On the diametrically opposite side, the cylinder head is formed with an exhaust passage 30 communicating with exhaust pipe 31 at its outer end, and with exhaust port 32 at its inner and controlled by exhaust valve 33 seating against valve seat 34. A second cylindrical extension 35 carries valve guide 36 for the stem 37 of exhaust valve 33. It will be understood that the valve stems 27 and 37 are interconnected through the action of valve springs with the usual valve cam shaft to be driven in the conventional manner.

Figure 2:
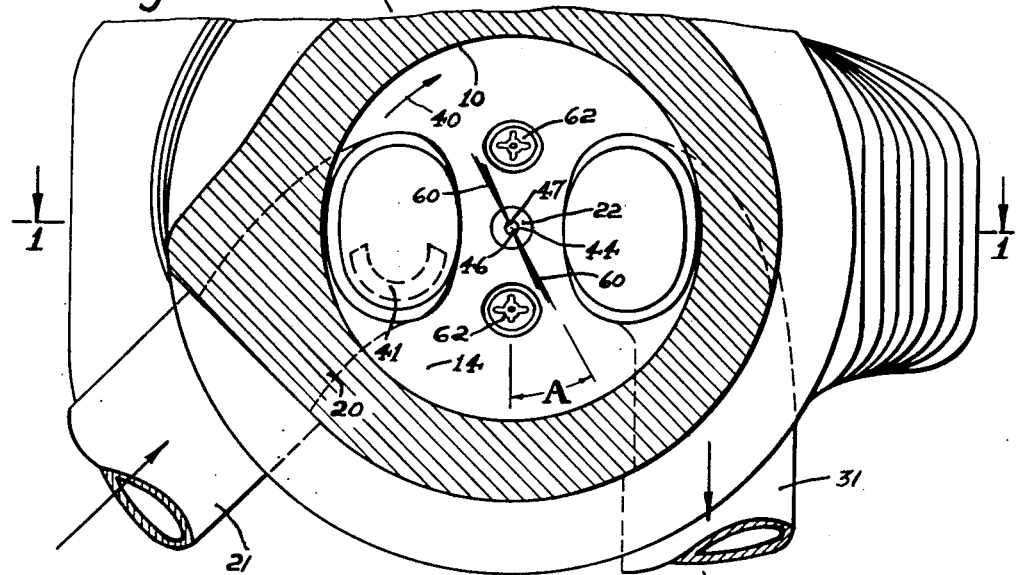
Fig. 2 is a plan view of the underside of the cylinder head when removed, the view being represented by the line 2—2 of Fig. 1.

From Fig. 2, it will be noted that the intake passage 20 opens into the combustion space 14 in a partially tangential manner, whereby a swirling movement of the air in the direction of the arrow 40 is imparted. From Figs. 1 and 2, it will be further noted that the intake valve 23 is equipped with a shroud 41 shown as extending approximately 90° about the periphery of the valve and set to direct air tangentially into the combustion space. Consequently, on the opening of intake valve 23, the shroud 41 blocks off a portion of the annular space between the valve seat 24 and the valve, thereby further directing the incoming air tangentially of the combustion space to increase the velocity of air swirl. It will be appreciated that the construction shown is a matter of convenience in connection with a dome-shaped air-cooled cylinder of this type, whereby the valves and ports controlled thereby may be symmetrically arranged with respect to the combustion space. In the construction shown, the shroud 41 will ordinarily have a circumferential extent about the periphery of the valve of 60–120°, depending on the extent of tangential inclination of the air intake passage and the velocity of air swirl desired. It is obvious that, the greater the extent of the shroud when set to direct air tangentially, the higher will be the velocity of the swirling air. Of course, a shroud can be offset from such a position, thereby enabling shrouds of 180° or more to be employed for the same air swirl velocity. From the standpoint of volumetric efficiency, it is desirable that the shroud be as small as possible while still producing the required air swirl velocity; and in this respect the construction shown is preferred. However, it is within the scope of the present invention to obtain the desired air swirl solely by the tangential positioning of the air intake passage or solely by a shrouded valve, or in any other suitable manner such as a sleeve valve controlling tangential ports. During the compression stroke of the piston, an additional swirling of the compressed air in planes at substantially right angles to the first-mentioned air swirl is induced. This results in a spiral movement of the compressed air about the hemispherical combustion space toward the latter part of the compression stroke, as indicated in Fig. 3.

The cylinder head is formed with a central opening within which is mounted a reducing member 43. This member receives a conventional injector having a nozzle 44 provided with a fuel conduit or passage controlled by spring pressed check valves (not shown) in conventional manner. As shown, the nozzle tip is formed with two diametrically opposed spray or jet openings 46 and 47 communicating with the fuel passage.

The system for supplying fuel to the injector is shown as comprising a fuel reservoir 50 supplying fuel through line 51 to a cam-operated plunger pump 52 of conventional construction which imparts the desired pressure to the fuel in the feed line 53 leading to the conduit of the injector for a selected period of time, as is well understood. The cam 54 of this pump is interconnected with the drive shaft of the engine in a conventional manner (not shown). During the working stroke of the plunger 55 of the cam-operated pump, fuel under high pressure flows through line 53 and depresses check valves controlling conduit 45 to permit passage of fuel under high pressure to the ports 46 and 47, thereby simultaneously injecting fuel in two radial jets across the swirling air in the combustion space. The rate and duration of fuel injection is controlled by the fuel pump in conventional manner, it being understood that the plunger 55 is suitably grooved to open a communication with a by-pass port at the desired instant in the working stroke to release the pressure in fuel line 53, which permits the check valves in the nozzle fuel passage to close. Also, the plunger may be rotatable to adjust the time in the cycle for communication with the by-pass passage to terminate fuel injection, the rotatable adjustment being under the control of a throttle in conventional manner. A heater 56, shown as an electrical coil heater, may be provided for the fuel line 53 to permit certain heavier fuels, such as heavy gas oil, light lubricating oil and the like, to be used in place of lighter fuels of the character of gasoline and kerosene.

While one type of satisfactory fuel system has been diagrammatically illustrated and described, it is to be understood that any suitable conventional type can be employed. For example, the system may include a fuel reservoir, a pump which imparts a constant high pressure to the fuel and supplies the same to an accumulating tank from which it is flowed to one or more cylinders at the selected pressure, and an injector which is positively controlled as by means of a cam-operated pintle valve. The fuel in liquid form is ordinarily supplied at a pressure of the order of about 500 to 4,000 pounds per square inch or higher. However, higher pressure fuel supply systems of the so-called unit injection type may be used.

From Fig. 2 it will be noted that the ports 46 and 47 are so located that the two fuel jets indicated at 60 are diametrically opposed. Mounted in the cylinder head at diametrically opposite sides of the fuel nozzle and substantially equidistant between the intake and exhaust valves, are two spark plugs 62. Each of the plugs is fastened in a suitable threaded opening 63 formed in the cylinder head, so that the inner end of the plug indicated at 64 (Fig. 3) protrudes slightly into the combustion space. The electrodes 65 of the plug are open to the combustion space so that the spark formed at the gap comes within the first increment of combustible fuel vapor-air mixture from the associated fuel jet. Each plug is connected by lead 66 in a suitable electrical ignition system which may be of conventional type, such as the magneto or the coil and breaker ignition circuit, so that the ignition is synchronized with engine operation. Preferably, both plugs of the same cylinder are connected for substantially simultaneous firing. As shown, lead 66 is connected to a contact post of the usual distributor 67 having an engine driven rotary member 68.

As noted more particularly from Figs. 2 and 3, the electrodes of plug 62 are located a substantial distance inwardly from the periphery of the cylinder indicated at 70, which is where the dome-shaped or curved portion of the head joins the cylindrical side wall. The electrodes should be located comparatively close to the nozzle tip 44. Satisfactory operation is secured when the electrodes are about ¾ to 2½ inches from the nozzle tip, preferably about 1-1½ inches. Generally, with the larger diameter cylinders within the upper end of the range of 4 to 10 inches specified above, and with the higher penetration fuel jets, the distance between the nozzle tip and the plug electrodes will be within the upper end of the range mentioned. With fuel jets of lower penetration and smaller diameter cylinders, a closer positioning of the plug electrodes to the nozzle tip within the range mentioned is employed, so long as sufficient distance is afforded for a portion of the injected fuel to be vaporized and form combustible fuel vapor-air mixture by the time it reaches the plug electrodes. Greater distances than about 2½ inches are ordinarily not used, since too large an amount of fuel is injected before the first formed combustible fuel vapor-air mixture reaches the plug electrodes, and spontaneous ignition and knocking are then possible.

As shown clearly in Fig. 2, each of the plugs 62 is positioned on the air downstream side of its associated fuel jet 60. The included angle A between the center line of each jet and the radial line passing through the electrodes 65 of its associated plug should be about 10-90°, with about 30-45° being preferred. Where the plug is positioned farther from the nozzle tip, a smaller included angle within the range specified is ordinarily used, and vice versa. Also, as shown clearly in Fig. 3, the fuel jet 60 is inclined downwardly a slight extent so that this jet is projected into substantially the same horizontal plane as the plug electrodes 65 by the time it has moved outwardly a distance corresponding to the distance of the electrodes from the nozzle tip. The included angle B formed between the jet 60 and the longitudinal axis of the cylinder and nozzle, which may be termed the central angle, is usually within the range of 60-90° with about 70-80° being preferred. It will be obvious that this angle is generally determined by the positioning of the plug, since the farther the plug is located radially from the nozzle tip, the lower the electrodes 65 will be along the curved dome; and consequently the central angle B should be smaller so that the jet 60 will move substantially into the horizontal plane of the plug electrodes or somewhat below that plane.

The operation of the engine is diagrammatically illustrated in Fig. 4. The injection advance is ordinarily set to start injection of fuel at about 85-20 crank angle degrees before top dead center of the compression stroke and preferably about 70-30° B. T. C., with best results for maximum power obtained at about 60° B. T. C. With the dome-shaped cylinder as shown, the nozzle is constructed to provide the two simultaneous jets, each of which has a solid penetrating core indicated at 72. As the jets move outwardly, the swirling air indicated by the arrow 40 peels off the outer soft layers of the core and rapidly forms combustible fuel vapor-air mixtures therefrom, as indicated at 73. The lighter combustible vapor thus formed is blown or deflected by the air in the direction of air swirl, and is brought into contact with the plug electrodes 65. Substantially at the time the first increment of injected fuel of each jet has formed combustible fuel vapor-air mixture which reaches the plug electrodes, sparks of igniting intensity are passed at said electrodes to ignite the mixtures and produce flame fronts at diametrically opposite sides of the combustion space.

The intensity of the jets 60 is sufficient so that said jets move outwardly opposite the plug electrodes in about 4-35 crank angle degrees of engine movement, and preferably about 4-10°. This intensity of the jets is also coordinated with the velocity of air swirl, so that the center core 72 carries the greater part of the fuel toward the periphery of the combustion space for uniform impregnation of the swirling air. As shown in Fig. 3, the inclination B of the jets is such that they would contact the curved dome before passing to the periphery 70 of the combustion space. Due to the vortex action of the induction air swirl, a vertical swirl indicated by the lines 75 substantially at right angles to the induction swirl 40 is present in the compressed air at the time of fuel injection. Consequently, the air in the lower and outer portions of the combustion space is moved upwardly into contact with the fuel jet by this vertical swirl, so that the desired uniform impregnation of the compressed air during the combustion period is secured by the combined action of the induction or horizontal swirl and the vertical swirl.

The spark advance is set to produce sparks of igniting intensity at the two electrodes 65 at about 4-35 crank angle degrees after the start of fuel injection, and preferably about 10-15 crank angle degrees. This insures that combustion is initiated and flame fronts established before sufficient fuel has been injected to create a substantial mass of unburned combustible fuel vapor-air mixture susceptible to spontaneous ignition. In other words, only localized patches of combustible mixture of such small extent are produced, which patches are confined on one side by incombustible air and on the other by mixture which is too rich to burn, that preignition and spontaneous ignition are both entirely avoided. The injection of fuel is then continued from both jets immediately in advance of the formed flame fronts. These flame fronts tend to remain more or less in fixed locations with respect to the nozzle and cylinder wall. Additional amounts of combustible fuel vapor-air mixtures are thus formed, ignited by the flames and burned substantially as rapidly as formed. The net result is that only localized patches of combustible mixtures of small extent are present throughout the period of combustion, and these are confined on one side by products of combustion and on the other by incombustible air or rich mixture, so that spontaneous ignition and knocking are not possible.

The velocity of induction or horizontal air swirl is coordinated with the rate and duration of fuel injection, so that the air is impregnated at a desired fuel-air ratio, and so that substantially all of the air is impregnated and consumed on each cycle for maximum power without overlap or impregnation of combustion products. It is preferred to employ a relatively short duration of fuel injection. An injection period of about 60-40 crank angle degrees for maximum power is regarded as substantially optimum. Consequently, an air swirl of about 3 to 6 times the R. P. M. of the engine produces movement of the entire body of air past the fuel jets on each cycle with the specified injection period. In the particular construction shown, with the partially tangential air inlet and the 90° shroud, the air swirl is about 4½ times the R. P. M. of the engine. It will be appreciated that the ignition lag will also vary with the velocity of air swirl, so that ignition is effective substantially at the time the first increment of injected fuel has formed combustible fuel vapor-air mixture and reaches the plug electrodes. A spark tolerance of about 5-15 crank angle degrees or somewhat more is found permissible without encountering knocking; and it is also found that the conventional ignition systems of both the magneto and coil and breaker types produce a spark of igniting intensity over a range of about 5-15 crank angle degrees or more. Consequently, the exact control of the ignition advance which would be required with an instantaneous spark is avoided.

While a dome-shaped engine with crowned piston has been described as a preferred embodiment of the present invention, it is to be understood that the invention is also applicable to radial injection of plural jets in engines having substantially flat heads and pistons. In such cases, fuel jets of a fan-shaped type in a vertical plane may be employed to uniformly impregnate the air throughout a vertical extent of the combustion space, where less of the vertical air swirl is present. Otherwise, the relationship of the parts may be substantially as described above.

Moreover, it should be pointed out that, where the combustion space is not symmetrical, such as where a crowned exhaust valve is employed, the center of the induction air swirl may be offset from the geometrical center or longitudinal axis of the combustion space. Even in some cases where the engine structure appears to provide a symmetrical combustion space, due to the partially tangential air intake port or other causes which have not been exactly determined, the center of air swirl is found to be slightly offset from the geometrical center of the combustion space. In such cases, it may be desirable that the injection nozzle tip be mounted substantially at or close to the center of air swirl to secure uniform impregnation of the air by the plural jets. It will be understood that, where the nozzle tip is described and claimed as being "substantially at the top center of the combustion space" or in other language of similar import, this means a location approximately at the center of air swirl.

While an engine having a double ported nozzle tip forming two diametrically opposed jets has been specifically described, it will be understood that more than two substantially equally spaced jets can be employed in accordance with the present invention, particularly in the larger diameter cylinders of the order of about 8-10 inches or more. However, this increases the number of spark plugs and electrical leads required; and the construction shown represents the preferred embodiment as constituting a compromise between the use of a multiplicity of apparatus and the attainment of short injection periods in large diameter cylinders.

While the nozzle tip having plural ports to form two or more equally spaced fuel jets as described above is particularly applicable to the larger diameter cylinders, it will be understood that the present invention involving induction air swirl about the longitudinal axis of the cylinder coupled with additional air swirl in planes substantially at right angles to the induction air swirl is applicable to smaller diameter cylinders up to about five inches in diameter equipped with a centrally positioned injection nozzle forming a single radial fuel jet. This is illustrated in Fig. 3, assuming the nozzle tip 44 to have merely a single port 47, the port 46 being blocked off. In this embodiment only a single spark plug 62 is employed with the electrodes 65 arranged with respect to the jet as heretofore described. As shown, the solid core 72 of the fuel jet is located adjacent the upper or outer portion of the combustion space and within the vertical air swirl adjacent the cylinder head. In this manner, the bulk of the compressed air within the combustion space is impregnated by a fuel jet of the solid core type within the relatively short period of fuel injection, assuming the duration of fuel injection to be set to approximate the time required for one complete rotation of the induction air swirl. This is of course the setting for substantially maximum power with a single fuel jet. Where lower power is required on each cycle, it will be understood that the duration of fuel injection is less than one complete rotation of induction air swirl; and, in that period, most of the air within the segment to be impregnated is brought into contact with the fuel jet by the combined action of the induction air swirl and the vertical air swirl. Even in the smaller diameter cylinders, it is generally preferred to have two diametrically opposed fuel jets in the manner previously described; and in such case, the duration of fuel injection will of course not exceed the time required for a half rotation of the induction air swirl.

While in the preferred embodiments of the invention described above, the nozzle tip is formed with a single orifice or port for each fuel jet, it is pointed out that this construction need not necessarily be followed. For example, the fuel spray which is associated with each spark plug can be produced by two or more orifices in the nozzle tip which are so grouped as to produce in effect a continuous spray in a localized zone, which functions in the manner of a single jet as previously described. A similar grouping of orifices is provided at the diametrically opposite side of the nozzle tip to produce a second continuous fuel spray throughout a localized zone associated with the second spark plug, where two jets and two spark plugs are employed. Also, instead of drilled-hole nozzles of the character described, the fuel jet or jets can be produced in other ways, such as by means of pintle type nozzles, adaptors or deflectors which deflect one or more fuel jets into individual sprays within the combustion space, and the like. Wherever the expression "nozzle tip having formed therein a plurality of injection ports" or "nozzle tip formed with two diametrically opposed ports" is used throughout the description and claims, it will be understood that this is done as a matter of convenience and such expression is intended to include the various forms and constructions for providing the continuous jet or jets throughout localized zones as described above.

Inasmuch as the limitations with respect to knock and preignition are eliminated by the present invention, it is preferred to operate the engine at a high compression ratio. Thus, it is generally preferred to operate the aviation engine on the Otto cycle at a compression ratio of about 8:1 to 9:1 to obtain the inherent increase in the cycle efficiency resulting from the higher compression ratio, while at the same time avoiding the necessary increase in cost, size and weight of the engine that is involved in Diesel engine construction for operation at higher compression ratios of the order of 14:1 to 16:1. Moreover, it will be understood that the air intake pipe 21 may communicate with a customary supercharger for operating the engine at increased charge densities. The engine of the present invention has been satisfactorily operated at air intake pressures ranging from atmospheric pressure to a boost pressure of 50 inches of mercury absolute and at speeds of 1600 R. P. M. to 2400 R. P. M. Knock-free operation has been obtained with both low and high octane liquid hydrocarbon fuels, such as a gasoline of 100 octane and a gasoline of 20 octane under the high compression ratios and the high boost pressures specified. Due to the fact that not all of the air is impregnated with fuel at loads below full load, the overall fuel-air ratio of the engine for cruising, or normal variable speed running including idling, is substantially below that of the usual Otto cycle engine. For example, the engine has been satisfactorily operated with overall fuel-air ratios varying between about 0.02 and 0.09.

Also, it should be understood that the injection and ignition timing set forth above are those for preferred operation on the Otto cycle at which the maximum efficiency is secured. However, the injection of fuel may be started at various points near the top of piston travel, and may even be begun shortly after top dead center, in which case operation on the Diesel or constant pressure cycle is approximated.

While the invention has been described above as applied to four-cycle operation, it is to be understood that the invention is also applicable to two-cycle operation; in fact, the invention lends itself particularly well to two-cycle operation because there is no necessity for preforming the fuel mixture, and this enables the suction stroke of four-cycle operation to be easily eliminated. For example, a two-cycle engine may be equipped with air intake ports for directional introduction of the air just above the bottom of piston travel whereby a swirling movement of the air can be imparted, as discussed above. Poppet exhaust valves may be provided at the opposite end of the cylinder for discharge of the exhaust gases. However, it is to be understood that any conventional construction or design of a two-cycle engine can be converted to this method of operation.

As previously discussed, a principal advantage of the engine of the invention results from the fact that satisfactory operation at high compression ratios and charge densities and with low octane fuels may be obtained. Thus, the invention includes the use of various normally liquid and normally gaseous fuels of both low and high octane values. As examples of suitable fuels there may be mentioned gasoline of low or high octane value, kerosene, Diesel fuels, methyl alcohol, light lubricating oils, butane, etc. It is important, however, that the fuel boil over such a range that at least a portion of the fuel is vaporized in the combustion space under the conditions existing therein at the time of injection. By preheating the fuel, liquid fuels boiling over an elevated range may be used.

It will be understood that the fuel in the fuel supply system is in liquid form to avoid vapor locking difficulties and secure the desired metering of fuel pumps and the like. The high pressure of the fuel injection system enables a normally gaseous fuel, such as butane, to be handled in liquid form in the fuel feeding system.

As a specific example of the present invention, the following is mentioned. A Wright air-cooled aviation engine cylinder having an internal diameter of 6⅛ inches was modified in accordance with Figs. 1–4. The engine was operated at a compression ratio of 8.7:1. A 90° shroud was employed on the air intake valve in conjunction with the partially tangential air intake passage. A double ported nozzle providing diametrically opposed radial fuel jets was provided with two associated spark plugs. Each plug was positioned 1¼ inches from the nozzle tip. The angle A between the center line of the jet and the radial line passing through the plug electrodes was varied between 30 and 45°. The central angle B between the inclination of each jet and the longitudinal axis of the cylinder and nozzle was 80°. Knock-free operation was obtained under all conditions, including variation of boost pressure from 30 inches to 50 inches of mercury absolute, in which IMEP of 36 to 142 pounds per square inch were obtained with specific fuel consumptions of 0.34 to 0.73 pound of fuel per hour.

Obviously many modifications and variations of the invention, as hereinbefore set forth, may be made without departing from the spirit and scope thereof, and therefore only such limitations should be imposed as are indicated in the appended claims.

I claim:

1. In the operation of an internal combustion engine having a power cylinder with a cylinder head and a piston providing a substantially hemispherical combustion space, the method which comprises introducing air into said cylinder in a manner to produce a high velocity air swirl therein about the longitudinal axis of said cylinder, compressing said air within said combustion space while maintaining the said high velocity air swirl and also inducing an additional swirl of the compressed air in planes at substantially right angles to the first mentioned air swirl, thereby resulting in a spiral movement of said compressed air about the hemispherical combustion space toward the latter part of the compression stroke of said piston, simultaneously injecting into the spirally swirling compressed air within said combustion space at least two substantially equally spaced jets of fuel, said jets being directed from a locus of injection at substantially the top center of said combustion space radially across the upper portion of the spirally swirling air, promptly spark igniting each of said jets at points located in the upper portion of said combustion space adjacent said locus of injection and substantially removed from the periphery of said cylinder and slightly on the air downstream side of each jet, thereby igniting each jet approximately as soon as localized combustible fuel vapor-air mixture is formed from the first increment of injected fuel from each jet to establish a plurality of flame fronts moving at high velocity counter to the respective localized swirling mixtures, and continuing the injection of fuel by said plurality of jets immediately in advance of said flame fronts in their direction of movement, thereby progressively forming a plurality of localized combustible fuel vapor-air mixtures which are ignited by the said flame fronts and burned substantially as rapidly as formed.

2. In an internal combustion engine of the character described, a power cylinder having a dome-shaped cylinder head, a piston reciprocatingly mounted within said cylinder and forming with said cylinder and cylinder head a substantially hemispherical combustion space, fuel injection means including a nozzle mounted centrally in said head with the nozzle tip substantially at the top center of said combustion space, air intake and exhaust passages formed in said head on opposite sides of said injection nozzle, intake and exhaust valves controlling said passages, said air intake passage and intake valve being formed to impart a high velocity swirling movement of the air introduced into said cylinder, said piston and cylinder head being formed to produce an additional swirl to the air in planes at substantially right angles to said first mentioned air swirl during the latter part of the compression stroke of said piston, thereby producing a spiral swirling movement of the compressed air about said hemispherical combustion space, said nozzle tip being formed with a plurality of injection ports spaced substantially equally around the tip and directed to produce a plurality of simultaneous radial fuel jets across the upper portion of the swirling air, a plurality of spark plugs including one for each jet mounted in said head intermediate said air intake and exhaust passages, each plug having electrodes positioned in the upper portion of said combustion space a substantial distance inwardly from the periphery thereof and adjacent said nozzle tip with the electrodes slightly on the air downstream side of the associated radial fuel jet, means synchronized with engine operation for initiating injection of fuel from said nozzle in said plurality of jets during the latter part of the compression stroke of said piston, means synchronized with engine operation for producing promptly after the start of fuel injection sparks of igniting intensity at each of said spark plug electrodes to initiate combustion of the localized combustible fuel-air mixture substantially as soon as formed from the first increment of injected fuel from each jet to thereby establish a plurality of flame fronts, and means for controlling the rate and duration of injection of fuel following ignition to simultaneously impregnate additional quantities of the swirling air immediately in advance of the said flame fronts and form additional localized combustible mixtures which are ignited and burned by the flame fronts substantially as rapidly as formed.

3. An internal combustion engine according to claim 2, wherein the nozzle tip is formed with two diametrically opposed ports arranged to direct the two radial fuel jets across the combustion space at the air downstream sides of said intake and exhaust valves.

4. In an internal combustion engine of the character described, a power cylinder having a dome-shaped cylinder head, a piston reciprocatingly mounted within said cylinder, a fuel injection nozzle mounted centrally in said head with the nozzle tip substantially at the top center of the combustion space formed between said dome-shaped head and said piston, an air intake formed in said head at one side of said nozzle and opening into said combustion space in a partially tangential manner, an intake valve controlling said intake and provided with a shroud extending around said valve less than 120° and set tangentially of the combustion space, said intake passage and intake valve with shroud imparting a high velocity swirling movement of the air introduced into said combustion space while maintaining the volumetric efficiency thereof, an exhaust passage formed in said head on the opposite side of said injection nozzle from said intake passage, an exhaust valve controlling said exhaust passage, said nozzle tip being formed with two substantially diametrically opposed injection ports directed to produce two simultaneous radial fuel jets across the upper portion of the swirling air, two electrical ignition plugs including one for each jet mounted in said head intermediate said air intake and exhaust passages, each plug having electrical ignition means positioned in the upper portion of said combustion space a substantial distance inwardly from the periphery thereof and adjacent said nozzle tip with the electrical ignition means of each plug slightly on the air downstream side of its associated radial fuel jet, means synchronized with engine operation for promptly electrically igniting at said plugs the localized combustible fuel-air mixtures substantially as soon as formed from the first increment of injected fuel from each jet to thereby establish two flame fronts, and means for controlling the rate and duration of injection of fuel following ignition to simultaneously impregnate additional quantities of the swirling air immediately in advance of said flame fronts and progressively form additional localized combustible mixtures which are ignited and burned by the flame fronts substantially as rapidly as formed.

EVERETT M. BARBER.

REFERENCES CITED

The following references are of record in the file of this patent:

UNITED STATES PATENTS

| Number | Name | Date |
| --- | --- | --- |
| 1,760,322 | Selby | May 27, 1930 |
| 2,001,358 | Guernsey | May 14, 1935 |
| 2,055,814 | Dennison | Sept. 29, 1936 |
| 2,100,143 | Mock | Nov. 23, 1937 |
| 2,142,280 | Mock | Jan. 3, 1939 |
| 2,146,265 | Moore, Jr. | Feb. 7, 1939 |
| 2,269,104 | Hedlund | Jan. 6, 1942 |
| 2,293,412 | Steiner et al. | Aug. 18, 1942 |
| 2,349,305 | Pyk | May 23, 1944 |